US006447692B1

(12) United States Patent
Momoda et al.

(10) Patent No.: US 6,447,692 B1
(45) Date of Patent: Sep. 10, 2002

(54) NANOMETER SIZED PHASE CHANGE MATERIALS FOR ENHANCED HEAT TRANSFER FLUID PERFORMANCE

(75) Inventors: Leslie A. Momoda, Los Angeles; Amanda C. Phelps, Malibu, both of CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/633,353

(22) Filed: Aug. 4, 2000

(51) Int. Cl.$^7$ ............................. C09K 5/06; C09K 5/10
(52) U.S. Cl. ............................. 252/70; 252/73; 252/74; 252/75; 252/76; 252/78.1; 252/78.3; 16/10; 16/104.19
(58) Field of Search ............................. 252/70, 73, 74, 252/75, 76, 78.1, 78.3; 165/10, 104.19

(56) References Cited

U.S. PATENT DOCUMENTS

| | | | |
|---|---|---|---|
| 3,964,929 A | | 6/1976 | Grevstad ..................... 136/86 |
| 4,504,402 A | * | 3/1985 | Chen et al. .................... 252/70 |
| 4,505,953 A | * | 3/1985 | Chen et al. .................... 427/212 |
| 4,911,232 A | * | 3/1990 | Colvin et al. ............. 165/104.17 |
| 5,007,478 A | * | 4/1991 | Sengupta ...................... 165/10 |
| 5,429,826 A | | 7/1995 | Nair et al. ................... 424/501 |
| 5,435,376 A | * | 7/1995 | Hart et al. ..................... 165/10 |
| 5,723,059 A | | 3/1998 | Snyder, Jr. .................... 252/70 |
| 6,099,894 A | * | 8/2000 | Holman .................... 427/126.3 |
| 6,171,647 B1 | * | 1/2001 | Holman ....................... 427/202 |
| 6,270,836 B1 | * | 8/2001 | Holman .................... 427/126.3 |

OTHER PUBLICATIONS

Stepina, V., et al., "Lubricants and Special Fluids", Chapter 1, Elsevier Science Publishers, Amsterdam (1992) pp. 32–37, 53–58, 639–643.
Colvin, D.P., et al., Enhanced Heat Transport in Environmental Systems Using Microencapsulated Phase Change Materials, 22nd International Conference on Environmental Systems, Seattle, WA Jul. 13–16, 1992, paper 921224, pp. 1–9.
Kamimoto, et al, "Latent Thermal Storage Using Pentaerythritol Slurry", 21st Intersociety Energy Conversion, Engineering Conference Advancing Toward Technology in Energy Conversion Aug. 25–29, 1986, CA Pp. 730–736.
Pileni, M.P., : Reversed Micelles as Microreactors, J. Phys. Chem., 97, (1993) pp. 6961–6973.
Banerjee, S., et al. "Polymer Precipitation Using a Micellar Nonsolvent: The Role of Surfactant–Polymer Interactions and the Development of a Microencapsulation Technique", Ind. Eng. Chem. Res., 35, (1996), pp. 3100–3107.
Eastman. J.A., et al., "Enhanced Thermal Conductivity Through the Development of Nanofluids", Mat. Res. Soc. Symp. Proc., vol. 457, (1997), pp. 3–11.
Shaake, R.C.F., et al. Thermodynamic Properties of the Normal Alkanoic Acids. II. Molar Heat Capacities of Seven Even–Numbered Alkanoic Acids', J. Chem/ Thermodynamics, 14 (1982), pp. 771–778.
Hale, D.V., et al. NASA Report, NASA–CR–61363 (1971).
Therminol D–12 fluid, manufactured by Solutia, Inc. of Saint Louis, Missouri (no date).
Flourinert fluids, manufactured by Minnesota Mining and Manufacturing Corp. of Saint Paul, Minnesota (no date).
Dynalene HF coolant, manufactured by Loikits Technologies, Inc. of Whitehall, Pennsylvania (no date).
Antonietti, et al., "Synthesis and Characterization of Noble Metal Colloids in Block C0polymer Micelles", Adv. Mater. 1995, vol. 7, No. 12, pp. 1000–1005.
Mulligan, J.C., et al., "Moencapsulated Phase–Change Material Suspensions for Heat Transfer in Spacecraft Thermal System," *Journal of Spacecraft and Rockets* vol. 33, No. 2, pp. 278–284 (Mar.–Apr. 1996).

* cited by examiner

*Primary Examiner*—Anthony J. Green
(74) *Attorney, Agent, or Firm*—Ladas & Parry

(57) ABSTRACT

A composition for enhanced heat transfer fluid performance, comprising a base heat transfer fluid and a nanometer sized phase change material. Introduction of nanometer sized phase change material into the heat transfer fluid leads to improved, high reversible thermal transport properties at elevated temperatures while ensuring low viscosity of the fluid at sub-freezing temperatures. A method for preparing of the heat transfer fluid with enhanced heat transfer performance, comprising making nanometer sized capsules having the phase change material contained therein and dispersing the capsules into the base heat transfer fluid.

61 Claims, 1 Drawing Sheet

NANOMETER SIZED PHASE CHANGE MATERIALS FOR ENHANCED HEAT TRANSFER FLUID PERFORMANCE

BACKGROUND OF THE INVENTION

1. Field of the Invention

This invention relates to the field of manufacturing of dielectric heat transfer fluids which can be pumped at sub-freezing temperatures and at the same time have high reversible thermal transport properties at temperatures up to 120° C.

In particular, this invention discloses low viscosity hydrocarbon or fluorinated hydrocarbon heat transfer fluids filled with under 30% (by volume) of a nanometer sized phase change material (hereinafter, nano-PCM), which improves the fluids' thermal properties. Such fluids are particularly important for the use in fuel cells. The invention discloses heat transfer fluids(and a method of making them) with increased heat capacity and high reversible heat transfer properties at temperatures up to 120° C. while maintaining low viscosity (below 10 cSt kinematic) at temperatures as low as −400° C.

2. Description of the Related Art

There are a number of commercially available cooling fluids which have acceptably low viscosities at low temperatures. However, all these materials, typically fluorinated or aliphatic hydrocarbons, have a common flaw—very poor thermal conductivity and heat capacity. These fluids have typical heat capacity of about 1–2 J/gK (1,000–2,000 J/kgK) (compared to about 3–4 J/gK (3,000–4,000 J/kgK) for water and other hydroxyl rich fluids). If the hydrocarbon structure of these fluids is modified to improve the heat capacity, the kinematic viscosity at low temperatures also rises making these fluids less desirable over the intended temperature range of application.

A number of solutions has been offered to solve these problems but none of the materials tried in the prior art was able to reach an acceptable combination of low enough viscosity at low temperatures and high reversible transport properties at elevated temperatures. At least four different methods, as described more specifically below, were tried and none brought about fully acceptable results.

(A) Use of De-Ionized Water

De-ionized water is the current state-of-the-art fluid for cooling of fuel cell systems. De-ionized water is an attractive fluid because it has superb dielectric properties as well as the highest thermal conductivity and heat capacity for any known fluid [0.59 W/mK and 4.1819 J/gK (4,181.9 J/kgK), respectively, at 200° C.]. De-ionized water also has very low kinematic viscosity of 1.798 cSt even at a temperature as low as a freezing temperature of 0° C. The use of de-ionized water was disclosed in Grevstad's U.S. Pat. No. 3,964,929, where de-ionized water with resistivity of at least about 20,000 ohm/cm was a preferred coolant. However, de-ionized water has two serious fundamental disadvantages.

First, it reacts with the metal of the bipolar plates of a fuel cell worsening the dielectric properties of de-ionized water over time. Second, it cannot be used as a heat transfer fluid below 0° C. because it freezes at that temperature. An anti-freeze additive, such as a glycol cannot be used to prevent the freezing at 0° C., because glycol solutions are very viscous at low temperatures (for example, a 40% solution of ethylene glycol in water, a very typical anti-freeze, has an unacceptably high viscosity of about 7 cSt at just 0° C.); therefore, a large amount of energy would be required to pump such coolant. Other popular anti-freeze additives, those based on salts, are unacceptable because they are corrosive and conduct electricity.

(B) Use of Low Temperature Heat Transfer Fluids and Coolants.

A number of fluids exhibiting acceptably low viscosity at sub-freezing temperatures with reasonably high flash points are available commercially. Typically, they are liquids based on straight chain perfluorinated hydrocarbons or aliphatic hydrocarbons (for instance, Fluorinert® fluids manufactured by Minnesota Mining and Manufacturing Corp. of Saint Paul, Minn.; Dynalene HF® coolant manufactured by Loikits Technologies, Inc. of Whitehall, Pa.; and Therminol D-12® fluid manufactured by Solutia, Inc. of Saint Louis, Mo.). Aromatic hydrocarbon-based fluids, such as Therminol LT® and Dynalene MV® coolants, are also available.

Despite their excellent fluidity at low temperatures, a number of serious drawbacks common to these products restrict their use. All of them have very low flash points, often offensive odors and incompatibility with sealing materials. Most importantly, they have poor thermal performance, such as low heat capacities and low thermal conductivities. The only realistic way to improve this poor thermal performance is to modify the molecular structure of these compounds by introducing some heat retaining groups, such as hydroxyls or thiols. This, however, leads to the deterioration in fluidity and, due to increased molecular interactions, the viscosities of these products grow unacceptably high at low temperatures. The modifications with the heat retaining groups also increase the reactivity of the fluid with metal causing corrosion and a decrease in dielectric performance with time. These disadvantages of low temperature heat transfer fluids and coolants are described in V. Stepina and V. Vesely, Lubricants and Special Fluids, Chapter 1, Elsevier Science Publishers, Amsterdam (1992).

(C) Use of Encapsulated Phase Change Materials

Micron sized encapsulated phase change materials (hereinafter, PCMs) have been added to a coolant where a latent heat of transformation, usually solid-to-liquid or solid phase I-to-solid phase II, was used to absorb a significant amount of heat. See, D. P. Colvin, J. C. Mulligan, and Y. G. Bryant, "Enhanced Heat Transport in Environmental Systems Using Microencapsulated Phase Change Materials," 22$^{nd}$ International Conference on Environmental Systems, Seattle, Wash., Jul. 13–16, 1992, paper 921224; M. Kamitomo, et. al., "Latent Thermal Storage Using Pentaerythritol Slurry," 21$^{st}$ Intersociety Energy Conversion Engineering Conference: Advancing Toward Technology Breakout in Energy Conversion, Aug. 25–29, 1986, San Diego, Calif., vol. 2, pp. 730–736.

Colvin, et. al., added 20–30% by weight of 20–40 micrometers sized encapsulated particles containing the paraffin wax to polyalphaolephin (PAO) dielectric coolant to increase its thermal performance. Kamimoto, et. al., investigated slurries containing 70–80% by weight of pentaerythritol encapsulated plastic crystals for heat storage applications.

The micron sized PCM particles have not performed well under repeated cycling. The larger particles were often crushed during pumping, and, in order to avoid such crushing, special diaphragm pumps were needed. In addition, the phase change of the PCMs was frequently incomplete due to the poor thermal conductivity of the PCM in the particle. As a result, Colvin et. al. had to increase the percentage of 20–40 micrometer sized PCM particles to 25–30% by weight, which in turn led to the increase in the fluid's viscosity. A lower cost encapsulation process, such as use of metal coating, was not viable for high voltage environments. In addition, even after the mechanical properties of the encapsulating shell had been somewhat improved, they were not good enough to ensure sufficient life of the slurries for the millions of cycles required.

(D) Prior Attempts At Encapsulation Within Nanometer Sized Capsules

The encapsulation of precipitated, nanometer sized materials, such as gold, silver salts, cadmium sulfide, and others, in micelles (oil-in-water emulsions) or reversed micelles (water-in-oil emulsions) has been previously achieved. Micelles or reversed micelles, with the typical size of droplets on the order of 10 to 1,000 Angstroms were self-formed through the use of suitable surfactants. It was shown that the fluid environment enclosed within a micelle or a reversed micelle can be used to precipitate reactants thereby forming nanometer sized particles. See, M. P. Pileni, "Reversed Micelles as Microreactors," J. Phys. Chem., 97 (1993), 6361–6973. These nanometer sized particles may be then more permanently encapsulated by one of the following methods:

- polymerizing oleophilic monomers which preferentially segment to the oil-water interface. See, S. Banerjee, et. al., "Polymer Precipitation Using a Micellar Nonsolvent: The Role of Surfactant-Polymer Interactions and the Development of A Microencapsulation Technique," Ind. Eng. Chem. Res., 35 (1996) 3100;
- condensing organometallic precursors with aliphatic substitutions which also preferentially segment to the oil-water interface;
- utilizing amphiphilic block or graft co-polymers. Amphiphilic or graft co-polymers are known to form micelles without the use of surfactants and have been used as nanometer sized encapsulants. See, M. Nair and Y. Yoo, U.S. Pat. No. 5,429,826. In the case of block co-polymer nanometer sized particles, the nanometer sized particles are, in addition, sterically stabilized which prevents agglomeration.

Nanometer sized PCMs have significant advantages as compared with micron sized encapsulated PCMs. They have higher effective heat capacity due to their higher phase change efficiency and they are less flow restrictive. In addition, they are less expensive to process when fluid based synthesis approaches are used. Their addition to dielectric heat transfer fluids would ensure that the fluids will possess all required properties while avoiding the above-described disadvantages of using de-ionized water, low temperature heat transfer fluids and coolants with micron sized encapsulated PCMS.

Yet, the nanometer sized PCMs have never been added to heat transfer fluids to obtain the advantages mentioned above. Eastman, et. al. used nanofluids to increase thermal conductivity. See, J. A. Eastman, et. al., "Enhanced Thermal Conductivity Through the Development of Nanofluids," Mat. Res. Soc. Symp. Proc., Vol. 457 (1997) 3–11. Eastman et. al., however, did not add the nanofluids to increase heat capacity, the property which is more important than thermal conductivity for the fuel cell and other dynamic applications.

For the foregoing reasons there remains a need for a dielectric heat transfer fluid having low viscosity at sub-freezing temperatures and high reversible thermal transport properties at temperatures up to 120° C. This fluid must remain stable during millions of cycles of pumping and must be also economically feasible. This invention offers such a fluid and the method of preparation thereof.

SUMMARY OF THE INVENTION

The present invention is directed to preparation of a heat transfer fluid with low viscosity at sub-freezing temperatures and enhanced heat transfer properties at temperatures as high as 120° C. Such fluid is made by incorporating a diluted dispersion of a nanometer sized PCM into a base heat transfer fluid. For the purposes of this invention, nanometer sized PCMs (or nano-PCMs) are defined as PCMs having particles with a size between about 10 and about 1,000 Angstroms.

Such PCM particles can be completely encapsulated within capsules having diameters between about 10 and about 1,000 Angstroms. Ensconcing the PCM particles within the nanometer sized capsules is not required in some cases, but, as subsequently discussed, the encapsulation is preferred in order to maintain the purity of the PCM particles.

Such PCMs effectively increase the heat capacity of the base coolant fluid because the PCMs undergo a phase change, typically, solid-to-liquid or solid phase I-to-solid phase II, and such transition is accompanied by the increase in the amount of heat energy absorbed by the PCMs.

The preferred diameter of the particles of the PCM is held to the submicron scale, within the range of about 50 to about 100 Angstroms, through the use of precipitation reactions within micelles or reverse micelles. The PCM particles may then be encapsulated via polymerization or sol-gel condensation processes. The nanometer sized particles thus prepared may then be sterically stabilized to prevent their aggregation followed by their dispersment in the base heat transfer fluid. The amount of the nanometer sized particles in the base heat transfer fluid is between about 0.1% and about 30% by volume.

The nanometer size of the particles improves the efficiency of the phase change because of the increased surface-to-volume ratio of the PCM (limited for micron sized particles by the poor transportation of heat into the particles). The ability of the fluids filled with the nano-PCMs of being pumped is also improved.

The heat transfer fluid loaded with the nano-PCMs have heat transfer properties comparable with those of de-ionized water while the concomitant increase in the viscosity is acceptable. For instance, for the PCMs having 95% completion in phase transition, with latent heat on the order of 200 J/g (200,000 J/kg), adding 13% of this PCM to the base heat transfer fluid brings about the heat transfer properties of the final product similar to those of de-ionized water while the viscosity increases only by a factor of two (based on the expression by Krieger and Dougherty for non-agglomerated diluted colloidal dispersions).

Techniques for preparing fluid based nanometer sized particles also facilitate the processing of the particles thus leading to more cost effective products. Nanometer sized encapsulated particles of the PCM possess increased thermal stability (compared to the micellar structure alone) and the purity of the PCM is preserved. Such purity is important for consistent phase changes at a well defined temperature, for example, because the presence of impurities often leads to melting point depression which must be avoided. Also, when the PCM is pure, its dispersment in the base fluid is facilitated.

In addition, a reverse process is also viable. In such process the nano-PCM-filled heat transfer fluid can be used to transfer heat to the system on start-up. The valves to the radiator would be closed and a portion of the fluid will be directed into the heat storage unit. The nano-PCM particles are then allowed to undergo a phase transition after release from the heat storage unit. On the system restart, and if the temperature of the system is less than the phase transformation temperature, the heat will be released to the system as the particles re-solidify.

BRIEF DESCRIPTION OF THE DRAWINGS

The features and advantages of the present invention will become better understood with regard to the following description, appended claims, and accompanying drawings where:

DETAILED DESCRIPTION OF THE INVENTION

Figure 1:
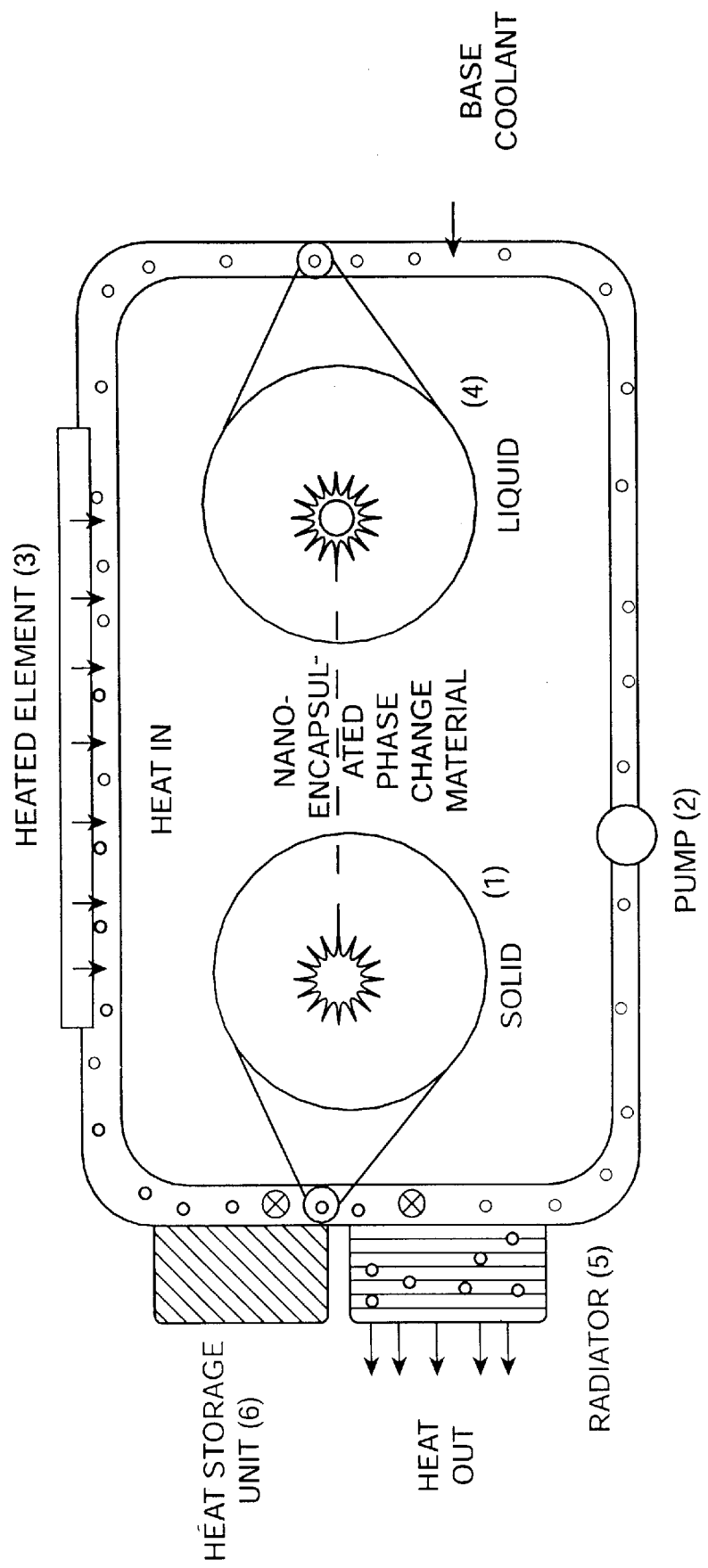
FIG. 1 is a schematic diagram showing the heat transfer process using the heat transfer fluid incorporating the nanometer sized phase change material in the cooling mode.

Preparation of the heat transfer fluid which incorporates nano-PCMs comprises the following steps:

(a) identification of the appropriate PCMs;

(b) crystallization and precipitation of the PCM;

(c) preparation of nanometer sized particles of the selected PCM, optionally followed by their encapsulation; and (d) optional stabilization and dispersing of the nanometer sized particles.

1. A Preferred Embodiment

In a preferred embodiment, the system to be cooled or heated is a stack of a proton exchange membrane (PEM) based fuel cell where the operating temperature is preferably within the range of between about 70° C. and 100° C., and more preferably is about 80° C. at which temperature the electrochemical cell reactions take place. Therefore, the appropriate transformation temperature for phase change materials is selected about 80° C. The operating temperature range can be adjusted by those ordinarily skilled in the art depending upon the particular PCM incorporated and its associated transition temperature.

Alternatively, the nano-PCM based coolants can be used in any flowing dielectric coolant system where transfer of a large or high heat load is required such as in power electronics or avionic or space based systems.

(A) Identification of the Appropriate PCMs and Preparation of Micelles

The list of acceptable PCM materials shown below in Table 1 comprises materials having a low differential volume phase change (solid-to-solid, solid-to-liquid) and high heat of transformation (on the order of 200 J/g [200,000 J/kg]) at or around 80° C.

TABLE 1

ACCEPTABLE PHASE CHANGE MATERIALS

| Compound | Transition temperature, ° C. | Latent heat, J/g | Transition type | Reference |
|---|---|---|---|---|
| Arachidic (Eicosanoic) acid, $CH_3(CH_2)_{18}COOH$ | 77 | 221 | Solid-liquid | Schaake |
| Behenic (Docosanoic)acid, $CH_3(CH_2)_{20}COOH$ | 80 | at least 221 | Solid-liquid | Hale |
| Acetamide, $CH_3CONH_2$ | 81 | 241 | Solid-liquid | Hale |
| Trimethylolethane (Pentaglycine), $CH_3C(CH_2OH)_3$ | 81 | 192 | Solid phase I-solid phase II | Hale |
| Monoaminopentaerythritol, $C(CH_2OH)_3 CH(NH_2)OH$ | 86 | 192 | Solid phase I-solid phase II | Hale |

See references: R.C.F. Shaake, et. al., "Thermodynamic Properties of the Normal Alkanoic Acids. II. Molar Heat Capacities of Seven Even-Numbered Alkanoic Acids," J. Chem. Thermodynamics, 14 (1982) 771–778; D. V. Hale, et. al., NASA Report, NASA-CR-61363 (1971).

All substances listed above have been determined to be appropriate phase change materials which can be used. Plastic crystals such as pentaglycine and monoaminopentaerythritol are preferred PCMs because they do not undergo a significant volume change in their phase change transition, and for fuel cell applications pentaglycine (or its mixtures with dilute amount of other plastic crystals) is a more preferred PCM because its transition temperature is within a preferred 70°C.–100° C. application range. Another acceptable PCM is 2-hydroxymethyl-2-methyl-1,3-propanediol having transition temperature 81° C., latent heat 192 J/g and melting point 197° C. The PCMs described above are introduced for illustrative purposes only and not by the way of limitation. A modification will suggest itself to those skilled in the art and other PCMs having properties within the parameters discussed above can be also used.

For the water-soluble PCMs (acetamide, trimethylolethane, and monoaminopentaerythritol), a saturated aqueous solution of the PCM is prepared at room temperature first. The concentration of the saturated solutions in water at room temperature for acetamide is about 2 g/ml, and for trimethylolethane about 0.5 g/ml.

The solution is then mixed with a surfactant and dispersed into an organic solvent to form discrete reverse micelles. Preferably, hydrocarbons, and more preferably simple aliphatic and aromatic is hydrocarbons, for instance, cyclohexane, or base coolants, such as Dynalene HF, perfluorinated (e.g., PF 5080, Fluorinert) or hydrofluoroether based systems are used as organic solvents.

Surfactants used for hydrocarbon based systems comprise non-ionic surfactants such as sodium bis(2-ethylhexyl) sulfosuccinate (also known as NaAOT), cetyltrimethylammonium bromide (CTAB), didodecyldimethylammonium bromide and Triton-X manufactured by Rohm & Haas Co. of Philadelphia, Pa. If perfluorinated (such as Fluorinert) or hydrofluoroether based systems are used, the surfactants comprise fluorinated surfactants such as Fluorad FC 170, FC 171 or FC 129 manufactured by Minnesota Mining and Manufacturing Corp. of Saint Paul, Minn.

The mole ratio between the aqueous solution of the PCM to the surfactant is between about 10 and about 500, preferably, between about 50 and about 150. The ratio of the blend of the aqueous solution of the PCM with the surfactant to the organic solvent is between about 1 and about 40 volume percent, preferably, between about 8 and about 30 volume percent.

The rest of acceptable PCMs are soluble in non-polar organic solvents. Oil-in-water type micelles containing these PCMs are prepared by methods well known to those skilled in the art, for example, by preparing a saturated solution of a non-water soluble PCM in such non-polar organic solvent followed by dispersing the solution in water.

(B) Crystallization and Precipitation of the PCM

The selected PCM, after the formation of a micelle or reverse micelle, is next crystallized inside the constrained interior of the micelle or reverse micelle. Such crystallization is achieved via standard reactions of precipitation known to those skilled in the art.

For all above-described acceptable PCMs, following crystallization and precipitation inside the micelle, the nanometer sized particles of the PCM are formed. Under above-described conditions of forming the micelles or reverse micelles, the size of the nanometer sized particles of the PCM is between about 50 Angstroms and about 100 Angstroms. The size of the nanometer sized particles of the PCM is measured using transmission electron microscopy.

Those skilled in the art will modify conditions of the formation of micelles and will achieve the size of the nanometer sized particles of the PCM which is between about 10 Angstroms and about 1,000 Angstroms, if desired.

The nanometer sized particles of the PCM are then optionally encapsulated within nanometer sized capsules.

(C) Optional Encapsulation of the Selected PCM Within Nanometer Sized Capsules The encapsulation of the PCM is optional for the PCMs undergoing solid-to-solid change. However, in case of all PCMs, including those undergoing solid-to-solid change, the encapsulation is a preferred step because when the PCM is ensconced within the capsules, purity of the PCM is maintained. As mentioned above, this encapsulation of the PCM within nanometer sized capsules is performed after the crystallization of the PCM.

There are three methods for such encapsulation of the PCM.

The first method is polymeric encapsulation. It is used for water soluble PCMs which formed reverse micelles as discussed above. A water soluble acidic polymerization catalyst, preferably hydrochloric, acetic or nitric acid, and more preferably, hydrochloric acid, is added to the reverse micelle. An aqueous alkylated alkoxysilane solution, preferably of ethyltriethoxy- or n-propyltri-n-propoxysilane is prepared separately by a method known to those reasonably skilled in the art. A surfactant described above is dissolved in the base coolant also described above. The saturated, acid-catalyzed PCM solution and the alkylated alkoxysilane solution are then added to the base coolant and stirred gently for about 4 hours. As a result, an alkylated polysiloxane shell is formed. In order to maintain a stable suspension, the resulting precipitate of the PCM is then mixed with a BAB oleophilic co-polymer, preferably Pluronic L61 co-polymer manufactured by BASF Corp. of Mount Olive, N.J.

In the polymeric encapsulation process described above, the molar ratio between the alkylated alkoxysilane and the surfactant is between about 0.2 to 1 and about 3 to 1, preferably, between about 0.25 to 1 and about 2 to 1. The molar ratio between the acid and the surfactant is between about 0.05 to 1 and about 0.74 to 1, preferably, between about 0.06 to 1 and about 0.5 to 1.

The second method is a metal-organic encapsulation, a variation of a sol-gel process. A metal-organic precursor is used where one ligand is substituted by an aliphatic or aromatic group R' as follows:

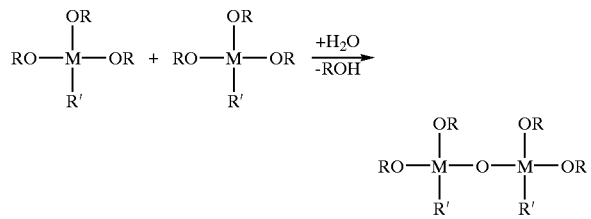

wherein R comprises $C_1$–$C_4$ radicals, straight chained or branched, preferably $C_2$, $C_3$, or $C_4$, straight chained or branched; R' comprises $C_1$–$C_4$ radicals, straight chained or branched, and phenyl; M comprises silicon, titanium, aluminum, zirconium, vanadium, niobium, and tantalum, preferably, silicon.

The oxoalkoxide ligands, OR, are hydrophilic and will preferentially sit in the aqueous environment; the substituted hydrocarbon ligand R' would preferentially migrate towards the hydrocarbon environment. The hybrid metal-organic precursors, such as for instance a methyl substituted tetraethylorthosilicate, would therefore preferentially surround a micelle or a reverse micelle. The hydroxyl groups of the oxoalkoxide ligands are then cross-linked through a condensation reaction to form a stable encapsulated nanoparticle followed as before by washing away the surfactant template, typically a salt, thus avoiding problems of ionic contamination of the heat transfer fluid.

The condensation for a precursor such as diethyldiethoxysilane (which is given as an example only and not by the way of limitation) occurs as follows. An aqueous solution of diethyldiethoxysilane is prepared by adding about 2 moles of water to about 1 mole of diethyldiethoxysilane. An acid catalyst such as hydrochloric, acetic, or nitric acid, preferably, hydrochloric acid, is added to the aqueous solution of diethyldiethoxysilane in the amount of not more than about 0.3 mole of the acid per about 1 mole of diethyldiethoxysilane.

The resulting acid-catalyzed aqueous solution of so polymerized alkylalkoxysilane is added to the aqueous PCM solution prepared as described above, in the amount of about 1 mole to about 4 moles of diethyldiethoxysilane per about 1 mole of the surfactant. The surfactant described above is dissolved in the base coolant also described above. The amphiphilic or graft co-polymer, also called a diblock co-polymer and subsequently described is also dissolved in the base coolant. The aqueous PCM solution is then mixed with the base coolant, preferably for two hours. The resulting solution is stirred for about 4 hours at a temperature ranging from room temperature to about 60° C., preferably at room temperature resulting in the precipitation of the PCM.

The amphiphilic co-polymer is then cross-linked and forms a tri-dimensional polymeric structure. The process of cross-linking is accomplished via thermal polymerization at a temperature of about 50° C. to about 70° C., preferably, at about 60° C. for a period of time between about 1 hour to about 2 hours, preferably, for about 2 hours; or via visible light or UV light curing, in which case a photoinitiator, such as benzophenone, benzoin methyl ether, bis-4,4'-(diethylaminobenzophenone), or Michler's ketone is added in the amounts known to those reasonably skilled in the art, with the exposure time being between about 1 hour to about 2 hours, preferably, for about 2 hours.

In this method the molar ratio between the co-polymer and the surfactant is between about 0.2 to 1 and about 3 to 1, preferably, between about 0.5 to 1 and about 1.5 to 1.

The first and the second methods of encapsulation of the PCM within nanometer sized capsules described above, namely, the method of polymeric encapsulation via polymerization and the method of metal-organic encapsulation, are the two equally preferable methods of such encapsulation. In the alternative, the third method of encapsulation of the PCM within nanometer sized capsules, the encapsulation with amphiphilic block or graft co-polymers can be used.

Amphiphilic block or graft co-polymers, such as AB diblock co-polymers, wherein A is a hydrophilic block and B is an oleophilic block, are used. The A block comprises polyalkylene oxides and polyvinylpyridine, preferably, polyethylene oxide and polypropylene oxide. The B block comprises polystyrene and polypropylene, preferably, polystyrene.

The preferred AB diblock co-polymer is polyethylene oxide-polystyrene co-polymer which has a hydrophilic and an oleophilic (hydrophobic) portions, giving them the ability to self-form into micelles or reverse micelles, depending on the relative solubilities of each end of the block in the aqueous and organic solvents. An aqueous saturated PCM solution is synthesized and acid catalyzed as described above in the method of polymeric encapsulation. The surfactant and AB diblock co-polymer are dissolved in the base coolant as described above in the method of metal-organic encapsulation. The saturated PCM solution is then stirred together with the base coolant for between about 2 hours and about 4 hours, preferably, for about 4 hours, leading to the precipitation of the PCM. The resulting PCM precipitate is mixed with a monomer, preferably an alkyl substituted phenol. The polymerization is carried in the presence of about 0.01 to about 0.5 volume per cent of a water soluble enzyme catalyst, preferably, a horseradish peroxidase. The reaction is initiated by adding about 0.5 milliliters of hydrogen peroxide, at room temperature, and takes about 18 hours to complete.

As a result, the oleophilic portion of the co-polymer is cross-linked thereby encapsulating the nanometer sized particle. The molar ratio between the monomer and the surfactant is between about 1 to 5 and about 1 to 1, preferably, between about 1 to 3 and about 1 to 4. Under above-described conditions of encapsulating particles of the PCM within the nanometer sized capsules, the diameter of these capsules preferably is between about 50 Angstroms and about 100 Angstroms. The diameter of the capsules is measured using transmission electron microscopy.

Those skilled in the art will modify conditions of the encapsulation and will achieve the diameter of the nanometer sized capsules which is between about 10 Angstroms and about 1,000 Angstroms, if desired.

(D) Optional Stabilization and Dispersing of the Nanometer Sized Particles

It is important to insure that nanometer sized PCMs remain discrete and do not agglomerate to prevent flow disruptions in, and blockage of, the ultimate heat transfer fluid. Preferably, the nanometer sized particles formed via polymeric or metal-organic encapsulation techniques described above can be sterically stabilized with a coating of a block co-polymer to prevent coagulation by creating a physical distance between the particles. The BAB triblock co-polymers are used for the steric stabilization, preferably BASF's Pluronic co-polymers.

After the nanometer sized crystalline PCM particles have been formed and stabilized, they are collected, preferably by vacuum filtration, and dispersed in the base heat transfer fluid in the amount of up to about 30%, preferably, up to about 25% by volume of the base fluid. In the alternative, they are washed and decanted.

In diluted dispersions of the nanometer sized particles of the PCM in base fluids, the particles do not usually tend to coagulate, agglomerate or aggregate. Therefore, the steric stabilization of the nanometer sized particles of the PCM is not required if concentration of these particles in base fluid does not exceed about 5% by volume of the base fluid. For such diluted systems, steric stabilization is optional.

The nanometer sized crystalline PCM particles are used with any low viscosity base heat transfer fluid, preferably, with those base fluids having low viscosities at sub-freezing temperatures (under about 14 cSt at $-40°0$ C.) and relatively high boiling (at least about 80° C.) and flash (at least about 59° C. by the Pensky-Martens method) points, such as 3M's Fluorinert®, PF-5070 and PF-5080 fluids, Loikits' Dynalene HFO coolant, and Solutia's Therminol D-12® fluid.

FIG. 1 demonstrates the principal features of the cooling system in the cooling mode of operation. Nanometer sized particles 1 contain crystalline solid PCM inside them. They are introduced into the heated element 3 where their temperature rises. As a result, the solid PCM undergoes the phase change and turns into a liquid or second solid phase II. The nanometer sized particles containing the PCM as a liquid solid phase II are marked 4. The fluid is circulated through the system by a pump 2. The process of the phase change absorbs heat which is dissipated through the radiator 5 followed by re-solidification or phase change to solid phase I of the PCM inside the particles.

As described above, the system can be also used to transfer heat to the system on start-up. The valves to the radiator 5 are closed and a portion of the fluid is directed into the heat storage unit 6. The nano-PCM particles are then allowed to undergo a liquid-to-solid or solid II-to-solid I phase transition after release from the heat storage unit 6. On the system restart, and if the temperature of the system is less than the phase transformation temperature, the heat will be released to the system as the particles re-solidify.

Having described the invention in connection with several embodiments thereof, modification will now suggest itself to those skilled in the art. As such, the invention is not to be limited to the described embodiments except as required by the appended claims.

We claim:

1. A composition for enhanced heat transfer fluid performance, comprising a base heat transfer fluid and a nanometer sized phase change material, said nanometer sized phase change material being dispersed in said base heat transfer fluid, wherein said base heat transfer fluid has a kinematic viscosity of not more than 14 cSt at −40° C., a boiling point of at least 80° C., and a flash point of at least 59° C. by Pensky-Martens method.

2. The composition according to claim 1, wherein a ratio between said nanometer sized phase change material and said base heat transfer fluid is between about 0.1% and about 30% by volume.

3. The composition according to claim 1, wherein said nanometer sized phase change material comprises particles of said phase change material having a diameter between about 10 Angstroms and about 1,000 Angstroms.

4. The composition according to claim 1, wherein said phase change material has a temperature and a heat of transformation; and wherein when said temperature falls in a range of 77° C. to 86° C., said heat of transformation falls in a range of 192 J/g to 241 J/g.

5. The composition according to claim 1, wherein a ratio between said nanometer sized phase change material and said base heat transfer fluid is between about 0.1% and about 25% by volume,.

6. The composition according to claim 1, wherein said nanometer sized phase change material comprises particles of said phase change material having a diameter between about 50 Angstroms and about 100 Angstroms.

7. The composition according to claim 1, wherein said phase change material is selected from the group consisting of trimgthylolethane, acetamide, monoaminopentaethritol, 2-hydroxymethtyl-2-methlyl-1,3-propanediol, arachidic acid, behenic acid, and combinations thereof.

8. A composition for enhanced heat transfer fluid performance, comprising a base heat transfer fluid and a nanometer sized phase change material, wherein said nanometer sized phase change material is dispersed in said base heat transfer fluid, wherein said nanometer sized phase change material comprises capsules having an outer shell with the phase change material contained therein.

9. The composition according to claim 8, wherein said outer shell comprises alkylated polysiloxane.

10. The composition according to claim 9, wherein said phase change material is selected from the group consisting of trimethylolethane, acetamide, monoaminopentaerythritol, 2-hydroxymethyl-2-methyl-1,3-propanediol, arachidic acid, behenic acid, and combinations thereof.

11. The composition according to claim 10, wherein said base heat transfer fluid has a kinematic viscosity of not more than 14 cSt at −40° C., a boiling point of at least 80° C., and a flash point of at least 59° C. by Pensky-Martens method.

12. The composition according to claim 9, wherein said base heat transfer fluid has a kinematic viscosity of not more than 14 cSt at −40° C., a boiling point of at least 80° C., and a flash point of at least 59° C. by Pensky-Martens method.

13. The composition according to claim 8, wherein said outer shell comprises hybrid metal-organic precursors having an oxoalkoxide ligand and a substited hydrocabon ligand, said hybid metal-organic precursors being cross-linked.

14. The composition according to claim 13, wherein:
 (a) said oxoalkoxide ligand comprises methoxy, ethoxy, propoxy, isopropoxy or butoxy, said butoxy being straight chained or branched chained;
 (b) said substituted hydrocarbon ligand comprises $C_1$–$C_4$ radicals, straight chained or branched, or phenyl; and
 (c) said metal comprises silicon, titanium, aluminum, zirconium, vanadium, niobium, or tantalum.

15. The composition according to claim 14, wherein said phase change material is selected from the group consisting of trimethylolethane, acetamide, monoaminopentaerythritol, 2-hydroxymethyl-2-methyl-1,3-propanediol, arachidic acid, behenic acid, and combinations thereof.

16. The composition according to claim 15, wherein said base heat transfer fluid has a kinematic viscosity of not more than 14 cSt at −40° C., a boiling point of at least 80° C., and a flash point of at least 59° C. by Pensky-Martens method.

17. The composition according to claim 14, wherein said base heat transfer fluid has a kinematic viscosity of not more than 14 cSt at −40° C., a boiling point of at least 80° C., and a flash point of at least 59° C. by Pensky-Martens method.

18. The composition according to claim 13, wherein said phase change material is selected from the group consisting of trimethylolethane, acetamide, monoaminopentaerythritol, 2-hydroxymethyl-2-methyl-1,3-propanediol, arachidic acid, behenic acid, and combinations thereof.

19. The composition according to claim 18, wherein said base heat transfer fluid has a kinematic viscosity of not more than 14 cSt at −40° C., a boiling point of at least 80° C., and a flash point of at least 59° C. by Pensky-Martens method.

20. The composition according to claim 13, wherein said base heat transfer fluid has a kinematic viscosity of not more than 14 cSt at −40° C., a boiling point of at least 80° C., and a flash point of at least 59° C. by Pensky-Martens method.

21. The composition according to claim 8, wherein said outer shell comprises cross-linked amphiphilic block and/or graft co-polymers.

22. The composition according to claim 21, wherein said amphiphilic block and/or graft co-polymers comprise AB diblock co-polymers.

23. The composition according to claim 21, wherein said phase change material is selected from the group consisting of trimethylolethane, acetamide, monoaminopentaerythritol, 2-hydroxymethyl-2-methyl-1,3-propanediol, arachidic acid, behenic acid, and combinations thereof.

24. The composition according to claim 23, wherein said base heat transfer fluid has a kinematic viscosity of not more than 14 cSt at −40° C., a boiling point of at least 80° C., and a flash point of at least 59° C. by Pensky-Martens method.

25. The composition according to claim 21, wherein said base heat transfer fluid has a kinematic viscosity of not more than 14 cSt at −40° C., a boiling point of at least 80° C., and a flash point of at least 59° C. by Pensky-Martens method.

26. The composition according to claim 8, wherein said phase change material is selected from the group consisting of trimethylolethane, acetamide, monoaminopentaerythritol, 2-hydroxymethyl-2-methyl-1,3-propanediol, arachidic acid, behenic acid, and combinations thereof.

27. The composition according to claim 26, wherein said base heat transfer fluid has a kinematic viscosity of not more than 14 cSt at −40° C., a boiling point of at least 80° C., and a flash point of at least 59° C. by Pensky-Martens method.

28. The composition according to claim 8, wherein said capsules have diameters between about 10 Angstroms and about 1,000 Angstroms.

29. The composition according to claim 8, wherein said capsules have diameters between about 50 Angstroms and about 100 Angstroms.

30. The method of claim 8, wherein said ration between said capsules and said base heat trnsfer fluid is between about 0.1% and about 25% by volume.

31. The composition according to claim 8, wherein said base heat transfer fluid has a kinematic viscosity of not more than 14 cSt at −40° C., a boiling point of at least 80° C., and a flash point of at least 59° C. by Pensky-Martens method.

32. A method for preparing a heat transfer fluid with enhanced heat transfer performance, comprising:
 making capsules having an outer shell and a phase change material contained therein, said phase change material being selected from the group consisting of trimethylolethane, acetamide, monoaminopentaerythritol, 2-hydroxymethyl-2-methyl-1,3-propanediol, arachidic acid, behenic acid, and combinations thereof; and
 dispersing said capsules into a base heat transfer fluid, so that a ration between said capsules and said base heat transfer fluid is between about 0.1% and about 30% by volume.

33. The method according to claim 32, wherein said making of capsules having an outer shell and a phase change material contained therein further comprises steps of:
(a) preparing a micelle or a reverse micelle containing said phase change material; and
(b) crystallizing said phase change material inside said micelle or said reverse micelle.

34. The method according to claim 33, further comprising steps of:
(a) encapsulating said phase change material within said capsules; and
(b) stabilizing said capsules.

35. The method according to claim 34, wherein said step of encapsulating of said phase change material within said capsules further comprises a polymeric encapsulation, a metal-organic encapsulation, or an encapsulation with amphiphilic block or graft co-polymers.

36. The method according to claim 34, wherein said step of stabilizing of said capsules comprises applying a coating of a block co-polymer to said capsules.

37. The method according to claim 33, wherein said step of preparing a reverse micelle containing said phase change material further comprises the steps of:
(a) dissolving said phase change material in water;
(b) mixing said dissolved phase change material with a surfactant; and
(c) dispersing a mixture of said dissolved phase change material with said surfactant in an organic solvent.

38. The method according to claim 33, wherein said step of preparing a micelle containing said phase change material further comprises steps of:
(a) dissolving said phase change material in a non-polar solvent; and
(b) dispersing said dissolved phase change material in water.

39. The method according to claim 32, wherein said base heat transfer fluid has a kinematic viscosity of not more than 14 cSt at −40° C., a boiling point of at least 80° C., and a flash point of at least 59° C. by Pensky-Martens method.

40. The method according to claim 32, wherein said outer shell comprises alkylated polysiloxane.

41. The composition according to claim 40, wherein said base heat transfer fluid has a kinematic viscosity of not more than 14 cSt at −40° C., a boiling point of at least 80° C., and a flash point of at least 59° C. by Pensky-Martens method.

42. The method according to claim 32, wherein said outer shell comprises hybrid metal-organic precursors having an oxoalkoxide ligand and a substituted hydrocarbon ligand, said hybrid metal-organic precursors being cross-linked.

43. The method according to claim 42, wherein:
(a) said oxoalkoxide ligand comprises methoxy, ethoxy, propoxy, isopropoxy, or butoxy, said butoxy being straight chained or branched chained;
(b) said substituted hydrocarbon ligand comprises $C_1$–$C_4$ radicals, straight chained or branched, or phenyl; and
(c) said metal comprises silicon, titanium, aluminum, zirconium, vanadium, niobium, or tatalum.

44. The composition according to claim 43, wherein said base heat transfer fluid has a kinematic viscosity of not more than 14 cSt at −40° C., a boiling point of at least 80° C., and a flash point of at least 59° C. by Pensky-Martens method.

45. The composition according to claim 42, wherein said base heat transfer fluid has a kinematic viscosity of not more than 14 cSt at −40° C., a boiling point of at least 80° C., and a flash point of at least 59° C. by Pensky-Martens method.

46. The method according to claim 32, wherein said outer shell comprises cross-linked amphiphilic block and/or graft co-polymers.

47. The method according to claim 46, wherein said amphiphilic block and/or graft co-polymers comprise AB diblock co-polymers.

48. The composition according to claim 46, wherein said base heat transfer fluid has a kinematic viscosity of not more than 14 cSt at −40° C., a boiling point of at least 80° C., and a flash point of at least 59° C. by Pensky-Martens method.

49. The method according to claim 32, wherein said capsules have diameters between about 10 Angstroms and about 1,000 Angstroms.

50. The method according to claim 32, wherein said said capsules have diameters between about 50 Angstroms and about 100 Angstroms.

51. A method for preparing a heat transfer fluid with enhanced heat transfer performance, comprising:
making capsules having an outer shell and a phase change material contained therein; and
dispersing said capsules into a base heat transfer fluid, so that a ratio between said capsules and said base heat transfer fluid is between about 0.1% and about 30% by volume, wherein said base heat transfer fluid has a kinematic viscosity of not more than 14 cSt at −40° C., a boiling point of at least 80° C., and a flash point of at least 59° C. by Pensky-Martens method.

52. The method accordin to claim 51, wherein said outer shell comprises alkylated polysiloxane.

53. The method accordin to claim 51, wherein said outer shell comprises hybrid metal-organic precursors having an oxoalkoxide ligand and a substituted hydrocarbon ligand, said hybrid metal-organic precursors being cross-linked.

54. The method accordin to claim 53, wherein:
(a) said oxoalkoxide ligand comprises methoxy, ethoxy, proposy, isoproposy, or botoxy, said botoxy being straight chained or branched chained;
(b) said substituted hydrocarbon ligand comprises $C_1$–$C_4$ radicals, straight chained or branched, or phenyl; and
(c) said metal comprises silicon, titanium, aluminum, zirconium, vanadium, niobium, or tantalum.

55. The method according to claim 51, wherein said outer shell comprises hybrid cross-linked amphiphilic block and/ or graft co-polymers.

56. A method for preparing a heat transfer fluid with enhanced heat transfer performance, comprising:
making capsules having an outer shell and a phase change material contained therein, wherein said outer shell comprises alkylated polysiloxane; and
dispersing said capsules into a base heat transfer fluid, so that a ratio between said capsules and said base heat transfer fluid is between about 0.1% and about 30% by volume.

57. A method for preparing a heat transfer fluid with anhanced heat transfer performance; comprising:
making capsules having an outer shell and a phase change material contained therein, wherein said outer shell comprises hybrid metal-organic precursors having an oxoalkoxide ligand and a substituted hydrocarbon ligand, wherein said hybrid metal-organic precursors are cross-linked; and
dispersing said capsules into a base heat transfer fluid, so that a ratio between said capsules and said base heat transfer fluid is between about 0.1% and about 30% by volume.

58. The method according to claim 57, wherein:
(a) said oxoalkoxide ligand comprises methoxy, ethoxy, propoxy, isopropoxy, or butoxy, said butoxy being straight chained or branched chained;
(b) said substituted hydrocarbon ligand comprises $C_1$–$C_4$ radicals, straight chained or branched, or phenyl; and
(c) said metal comprises silicon, titanium, aluminum zirconium, vanadium, niobium, or tantalum.

59. The method according to claim 57, wherein the phase change material comprises a nanometer sized phase change material having particles with a size between about 10 and about 1,000 Angstroms.

60. The method according to claim 57, wherein the phase change material comprises a nanometer sized phase change material having particles with a size between about 50 and about 100 Angstroms.

61. A method for preparing a heat transfer fluid with anhanced heat transfer performance, comprising:
making capsules having an outer shell and a phase change material contained therein, wherein said outer shell comprises cross-linked amphiphilic block and/or graft co-polymers; and
dispersing said capsules into a base heat transfer flued, so that a ratio between said capsules and said base heat transfer fluid is between about 0.1% and about 30% by volume.

* * * * *